US012809303B2

(12) United States Patent
Ishizuka et al.

(10) Patent No.: US 12,809,303 B2
(45) Date of Patent: Nov. 24, 2026

(54) IMAGE FORMING APPARATUS

(71) Applicant: BROTHER KOGYO KABUSHIKI KAISHA, Nagoya (JP)

(72) Inventors: Daisuke Ishizuka, Nagoya (JP); Atsushi Ozawa, Aichi-gun (JP); Hideshi Nishiyama, Owariasahi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 25 days.

(21) Appl. No.: 19/179,225

(22) Filed: Apr. 15, 2025

(65) Prior Publication Data

US 2026/0010113 A1 Jan. 8, 2026

Related U.S. Application Data

(63) Continuation of application No. 18/181,856, filed on Mar. 10, 2023, now Pat. No. 12,298,701, which is a continuation of application No. 17/238,900, filed on Apr. 23, 2021, now Pat. No. 11,635,726, which is a (Continued)

(30) Foreign Application Priority Data

Mar. 8, 2019 (JP) ................................ 2019-042331

(51) Int. Cl.
*G03G 21/16* (2006.01)

(52) U.S. Cl.
CPC ..... *G03G 21/1642* (2013.01); *G03G 21/1633* (2013.01)

(58) Field of Classification Search
CPC ............... G03G 21/16; G03G 21/1623; G03G 21/1633; G03G 21/1642; G03G 21/1647; G03G 21/1661; G03G 21/1671; G03G 21/1676; G03G 2221/16; G03G 2221/1651; G03G 2221/1654; G03G 2221/1678; G03G 2221/1687
See application file for complete search history.

(56) References Cited

U.S. PATENT DOCUMENTS

| | | | | |
|---|---|---|---|---|
| 2008/0170880 | A1 | 7/2008 | Hashimoto | |
| 2016/0216684 | A1* | 7/2016 | Kobayashi | G03G 21/1821 |
| 2018/0143566 | A1* | 5/2018 | Kawasumi | G03G 15/0886 |

FOREIGN PATENT DOCUMENTS

| | | | |
|---|---|---|---|
| JP | 2008-170961 | A | 7/2008 |
| JP | 2018-49200 | A | 3/2018 |

* cited by examiner

*Primary Examiner* — Thomas S Giampaolo, II
(74) *Attorney, Agent, or Firm* — Merchant & Gould P.C.

(57) ABSTRACT

An image forming apparatus including a main body casing, a cover, a drum cartridge, a developing cartridge, an intermediate transfer belt and a movable cam. The movable cam is movable among a first position when the cover is in the open position, a second positon and a third position when the cover is in the closed position. In a case where the movable cam is in the first position, the photosensitive drum is in a first drum position spaced from the intermediate transfer belt, and the developing roller is in a first developing position spaced from the photosensitive drum. In a case where the movable cam is in the second position, the photosensitive drum is positioned toward the intermediate transfer belt from the first drum position. In a case where the cam is in the third position, the developing roller is positioned toward the photosensitive drum from the first developing position.

8 Claims, 7 Drawing Sheets

Related U.S. Application Data continuation of application No. 16/782,215, filed on Feb. 5, 2020, now Pat. No. 11,003,128.

IMAGE FORMING APPARATUS

CROSS-REFERENCE TO RELATED APPLICATION

This is a continuation of U.S. patent application Ser. No. 18/181,856, filed Mar. 10, 2023, which is a continuation of U.S. patent application Ser. No. 17/238,900, filed Apr. 23, 2021, now U.S. Pat. No. 11,635,726, issued Apr. 25, 2023, which is a continuation of U.S. patent application Ser. No. 16/782,215, filed Feb. 5, 2020, now U.S. Pat. No. 11,003, 128, issued May 11, 2021, which claims priority from Japanese Patent Application No. 2019-042331 filed on Mar. 8, 2019, the content of both of which is incorporated herein by reference in their entirety.

TECHNICAL FIELD

Aspects of the disclosure relate to an image forming apparatus including a drum cartridge and a developing cartridge, each of which is removably insertable to a main body casing of the image forming apparatus.

BACKGROUND

Some known image forming apparatus is configured such that a drum cartridge and a developing cartridge are individually insertable into and removable from a main body casing of the image forming apparatus. In such an image forming apparatus, the drum cartridge and the developing cartridge are insertable into and removable from the main body casing in an axial direction of a photosensitive drum, respectively.

SUMMARY

In such a known image forming apparatus, during insertion of the drum cartridge into the main body casing, the photosensitive drum may be separate from an intermediate transfer belt to prevent or reduce damage to either or both of the photosensitive drum and the intermediate transfer belt due to contact of the photosensitive drum to the intermediate transfer belt. As a cover moves from an open position to a closed position in a state where the drum cartridge is attached to the main body casing, the drum cartridge is displaced toward the intermediate transfer belt and thus the photosensitive drum contacts the intermediate transfer belt.

Further, during insertion of the developing cartridge into the main body casing, the developing roller may be separate from the photosensitive drum to prevent or reduce damage to either or both of the developing roller and the photosensitive drum due to contact of the developing roller and the photosensitive drum. In a state where the drum cartridge and the developing cartridge are attached to the main body casing, the user moves the cover from the open position to the closed position. Thereafter, a motor and a cam cause the developing cartridge to be displaced toward the drum cartridge to contact the developing roller to the photosensitive drum.

The known image forming apparatus may thus require two actions prior to starting an image forming operation. The two actions may include a first action that a user moves the cover from the open position to the closed position to cause the drum cartridge to be displaced toward the intermediate transfer belt to contact the photosensitive drum to the intermediate transfer belt, and a second action that the motor and the cam cause the developing cartridge to be displaced toward the photosensitive drum to contact the developing roller to the photosensitive drum.

Aspects of the disclosure relate to an image forming apparatus in which a single action that a user moves a cover from an open position to a closed position may enable displacement of a drum cartridge toward an intermediate transfer belt to contact a photosensitive drum to an intermediate transfer belt, and thereafter, displacement of a developing cartridge toward the photosensitive drum to contact a developing roller to the photosensitive drum, without using a motor for such displacements.

According to an illustrative embodiment of the present disclosure, there is provided an image forming apparatus including a main body casing, a cover, a drum cartridge, a developing cartridge, an intermediate transfer belt and a movable cam. The main body casing has an opening. The cover is movable between an open position in which the cover does not cover the opening and a closed position in which the cover covers the opening. The drum cartridge includes a photosensitive drum rotatable about a first axis extending in a first direction. The drum cartridge is removably insertable into the main body casing through the opening in the first direction. The developing cartridge includes a developing roller rotatable about a second axis extending in the first direction. The developing cartridge is removably insertable into the main body casing through the opening in the first direction. The intermediate transfer belt is positioned above the drum cartridge and the developing cartridge in a state where the drum cartridge and the developing cartridge are attached to the main body casing. The movable cam is movable among a first position when the cover is in the open position, a second position and a third position when the cover is in the closed position. The second position is intermediate to the first position and the third position. In a case where the movable cam is in the first position, the photosensitive drum is in a first drum position spaced from the intermediate transfer belt, and the developing roller is in a first developing position spaced from the photosensitive drum. In a case where the movable cam is in the second position, the photosensitive drum is positioned toward the intermediate transfer belt from the first drum position. In a case where the cam is in the third position, the developing roller is positioned toward the photosensitive drum from the first developing position.

DETAILED DESCRIPTION

An illustrative embodiment will be described with reference to the accompanying drawings. A description will be first provided on an overall configuration of a color printer 1 as an example of an image forming apparatus.

Figure 1:
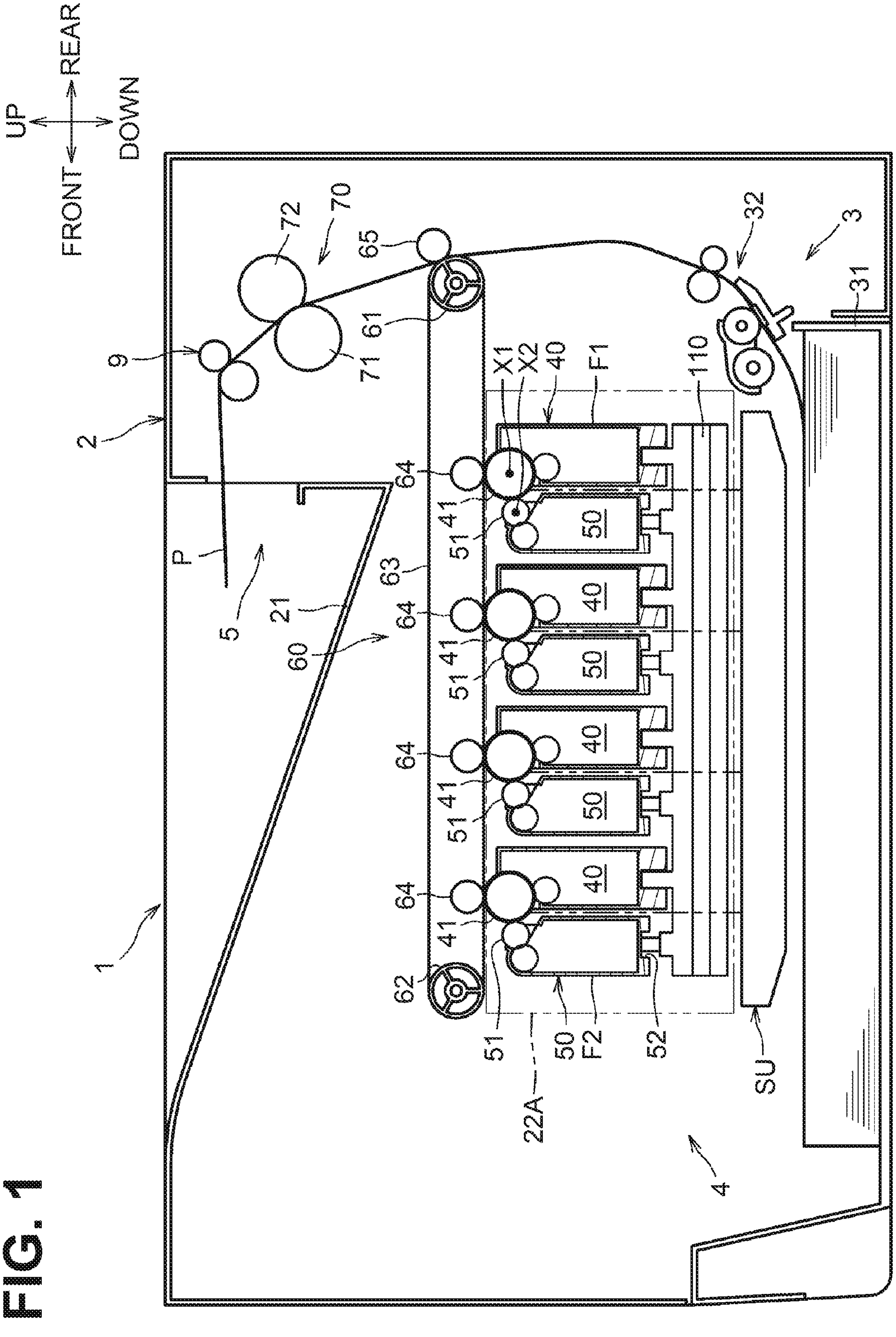
FIG. 1 is a sectional view illustrating a general configuration of a color printer according to an illustrative embodiment of the disclosure.

As illustrated in FIG. 1, the color printer 1 includes a main body casing 2, a feed unit 3, an image forming unit 4, and a discharge unit 5. The feed unit 3 is configured to feed a sheet S to the image forming unit 4. The image forming unit 4 is configured to form an image onto a sheet S. The discharge unit 5 is configured to discharge a sheet S to the outside of the main body casing 2.

The feed unit 3 is positioned in a lower portion of the main body casing 2. The feed unit 3 includes a feed tray 31 and a feed mechanism 32. The feed tray 31 is insertable into and removable from the main body casing 2. The feed mechanism 32 is configured to feed a sheet S from the feed tray 31 to the image forming unit 4.

The feed unit 3 is positioned below a movable cam 110.

The image forming unit 4 includes a plurality of, for example, four drum cartridges 40, a plurality of, for example, four developing cartridges 50, an exposure device SU, a transfer unit 60, and a fixing unit 70.

Each drum cartridge 40 includes a photosensitive drum 41, a charger, and a drum frame F1. The photosensitive drum 41 is rotatable about a first axis X1 extending in a first direction. In a state where the drum cartridges 40 are attached to the main body casing 2, the drum cartridges 40 are next to each other in a second direction intersecting the first direction.

The first direction is perpendicular to an up-down direction. The second direction is perpendicular to the first direction and the up-down direction. The up-down direction corresponds to a vertical direction.

Each developing cartridge 50 includes a developing roller 51 and a developing frame F2. The developing frame F2 stores developer. The developing roller 51 is rotatable about a second axis X2 extending in the first direction.

Figure 2:
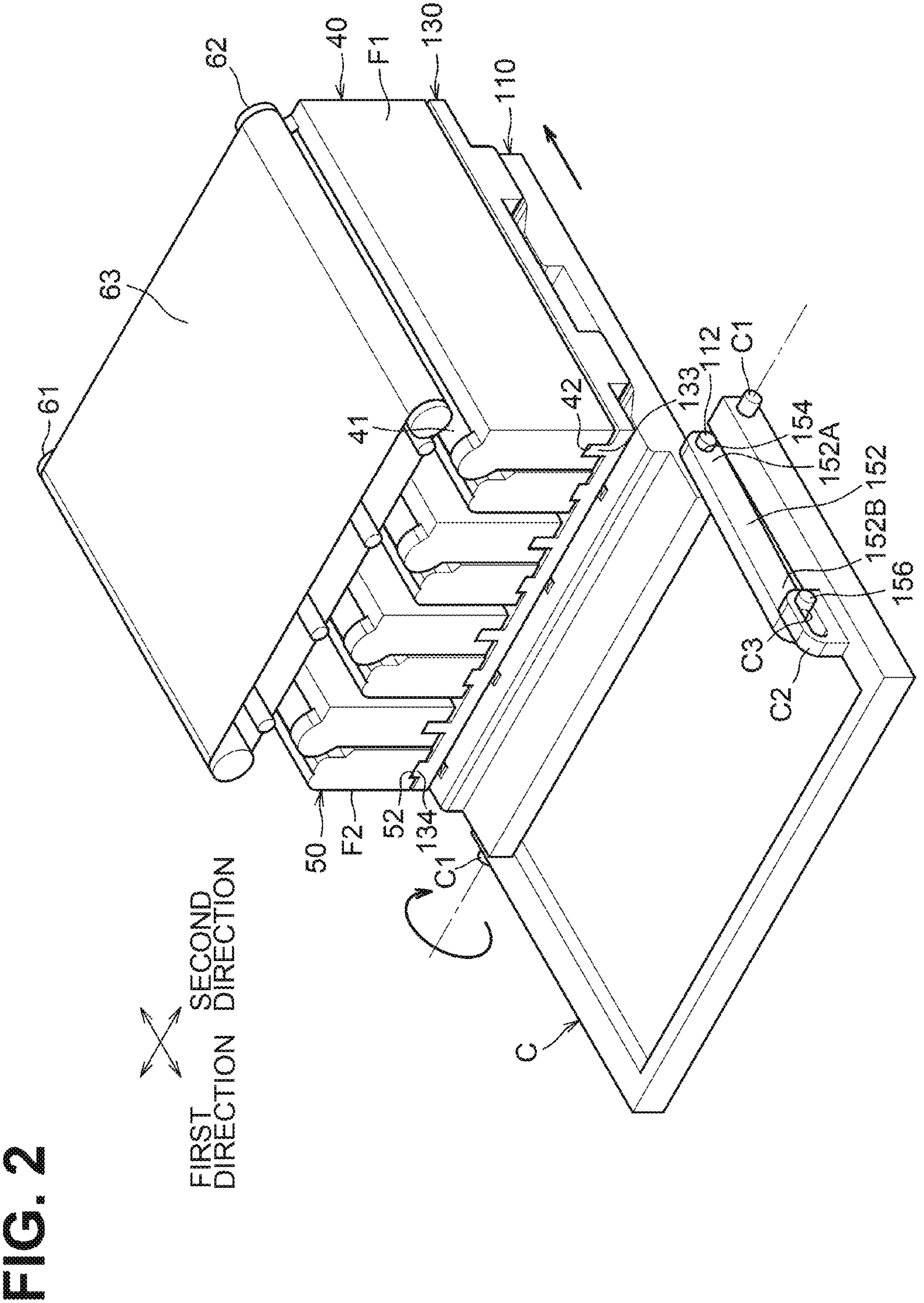
FIG. 2 is a perspective view of a cover, a movable cam, and a first lifter.

In a state where the drum cartridges 40 and the developing cartridges 50 are attached to the main body casing 2, the drum cartridges 40 and the developing cartridges 50 are alternately arranged in the second direction. As illustrated in FIG. 2, each of the drum cartridges 40 is insertable into and removable from the main body casing 2 in the first direction. Likewise, each of the developing cartridges 50 is insertable into and removable from the main body casing 2 in the first direction. All of the drum cartridges 40 may have the same configuration. All of the developing cartridges 50 may have the same configuration. Therefore, one of the drum cartridges 40 and one of the developing cartridges 50 will be described in detail, and a description for the others will be omitted. In the description below, other plural same components may have the same or similar configuration and function in the same or similar manner to each other. Therefore, one of the plural same components will be described in detail, and a description for the others will be omitted.

The exposure device SU is positioned below the drum cartridges 40. The exposure device SU is configured to irradiate a circumferential surface of each photosensitive drum 41 with a laser beam.

The transfer unit 60 is positioned between the photosensitive drums 41 and a discharge tray 21 in the up-down direction. The transfer unit 60 includes a drive roller 61, a driven roller 62, an intermediate transfer belt 63, a plurality of, for example, four, first transfer rollers 64, and a second transfer roller 65.

The intermediate transfer belt 63 may be an endless belt. In a state where the drum cartridges 40 and the developing cartridges 50 are attached to the main body casing 2, the intermediate transfer belt 63 is positioned above the drum cartridges 40 and the developing cartridges 50.

The first transfer rollers 64 are positioned inside the loop of the intermediate transfer belt 63. The first transfer rollers 64 and the respective corresponding photosensitive drums 41 sandwich the intermediate transfer belt 63 therebetween.

The second transfer roller 65 is positioned outside the loop of the intermediate transfer belt 63. The second transfer roller 65 and the drive roller 61 sandwich the intermediate transfer belt 63 therebetween.

The fixing unit 70 is positioned above the intermediate transfer belt 63. The fixing unit 70 includes a heat roller 71 and a pressure roller 72. The pressure roller 72 is configured to be pressed toward the heat roller 71.

The discharge unit 5 is positioned in an upper portion of the main body casing 2. The discharge unit 5 is positioned above the intermediate transfer belt 63. The discharge unit 5 includes discharge rollers 9 and the discharge tray 21. The discharge rollers 9 are configured to convey a sheet S toward the discharge tray 21.

In the color printer 1, first, the charger charges the circumferential surface of each photosensitive drum 41. Thereafter, the exposure device SU exposes the circumferential surface of each photosensitive drum 41. Thus, an electrostatic latent image is formed on the circumferential surface of each photosensitive drum 41.

After that, each developing roller 51 supplies developer onto the electrostatic latent image formed on a corresponding photosensitive drum 41, thereby forming a developer image on the circumferential surface of each photosensitive drum 41. Each first transfer roller 64 then transfers the developer image onto an outer circumferential surface of the intermediate transfer belt 63 from the circumferential surface of the corresponding photosensitive drum 41.

When a sheet S passes between the intermediate transfer belt 63 and the second transfer roller 65, the second transfer roller 65 transfers the overlapping developer images onto the sheet S from the outer circumferential surface of the intermediate transfer belt 63. Thereafter, the fixing unit 70 fixes the transferred developer images onto the sheet S. The discharge rollers 9 then convey the sheet S to discharge the sheet S to the discharge tray 21.

The main body casing 2 has an opening 22A. The opening 22A allows each drum cartridge 40 and each developing cartridge 50 to pass therethrough during their insertion or removal in the first direction.

As illustrated in FIG. 2, the color printer 1 further includes a cover C. The cover C is configured to cover and uncover the opening 22A. The cover C includes shafts C1 at respective ends of its lower end portion in the second direction. The shafts C1 are engaged with respective bearings of the main body casing 2 by insertion. The cover C is movable between an open position at which the cover C covers the opening 22A (e.g., the position of the cover C illustrated in FIG. 2) and a closed position at which the cover C uncovers the opening 22A.

The cover C further includes an arm retaining portion C2 at one end portion in the second direction. The arm retaining portion C2 has an elongated hole C3. The elongated hole C3 is engaged with a cylindrical protrusion 156 of an arm 152.

In the drum cartridge 40, the photosensitive drum 41 is rotatably supported by the drum frame F1. The drum cartridge 40 has a drum groove 42 in a bottom of the drum frame F1. The drum groove 42 extends in the first direction. The drum groove 42 may be engaged with a corresponding one of drum guide protrusions 133. The drum cartridge 40 may be guided by a corresponding drum guide protrusion 133 via the drum groove 42.

In the developing cartridge 50, the developing roller 51 is rotatably supported by the developing frame F2. The developing cartridge 50 has a developing groove 52 in a bottom of the developing frame F2. The developing groove 52 extends in the first direction. The developing groove 52 may be engaged with a corresponding one of developing guide protrusions 134. The developing cartridge 50 may be guided by a corresponding developing guide protrusion 134 via the developing groove 52.

The developing cartridge 50 has a dimension shorter than a dimension of the drum cartridge 40 in the up-down direction. More specifically, for example, in a state where the drum cartridge 40 and the developing cartridge 50 are attached to the main body casing 2, the developing cartridge 50 has the dimension in the up-down direction such that at least a portion of the developing roller 51 is located below an entirety of the photosensitive drums 41 in the up-down direction.

Figure 4A:
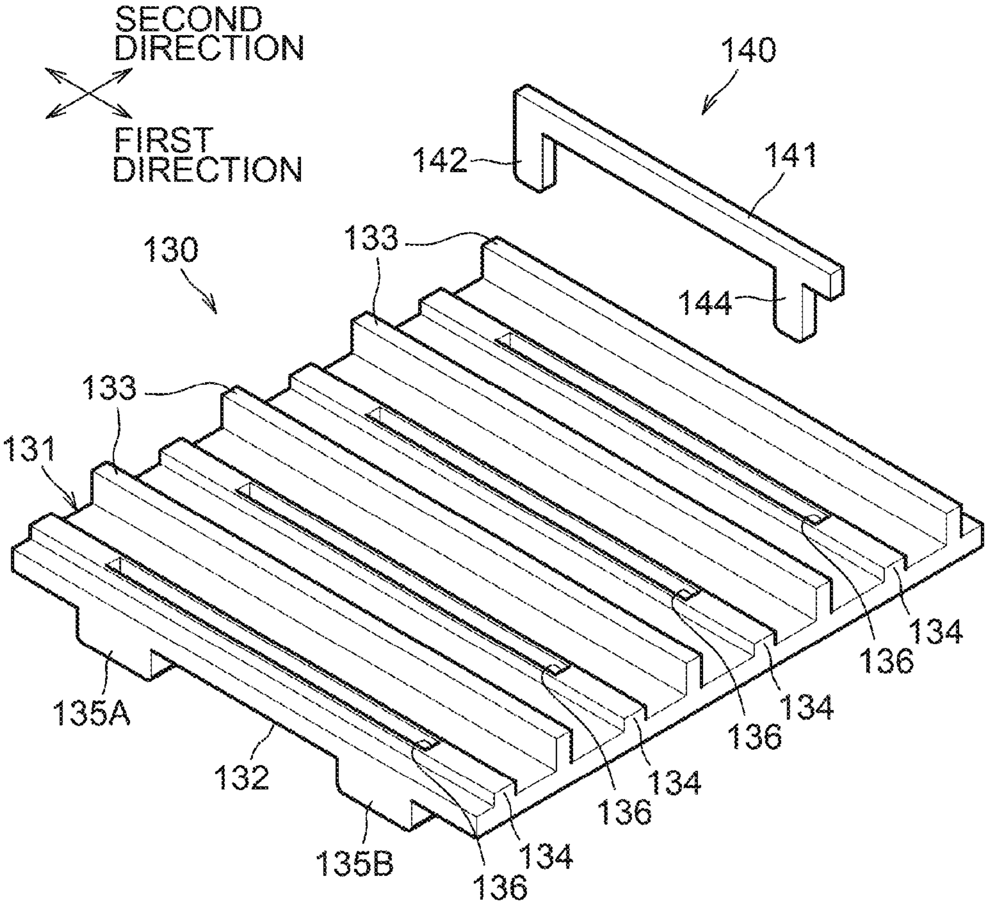
FIG. 4A is a perspective view of the first lifter and a second lifter.

The main body casing 2 further includes the movable cam 110, a first lifter 130, and second lifters 140 (only one of the second lifters 140 is illustrated in FIG. 4A).

In a state where the drum cartridges 40 and the developing cartridges 50 are attached to the main body casing 2, the movable cam 110 is positioned below the drum cartridges 40 and the developing cartridges 50.

The movable cam 110 may be a plate-shaped member. The movable cam 110 is configured to, in response to the cover C moving from the open position toward the closed position, move along the first direction. More specifically, for example, the movable cam 110 is configured to, in conjunction with opening or closing of the cover C, move along the first direction via the arm 152.

Figure 3A:
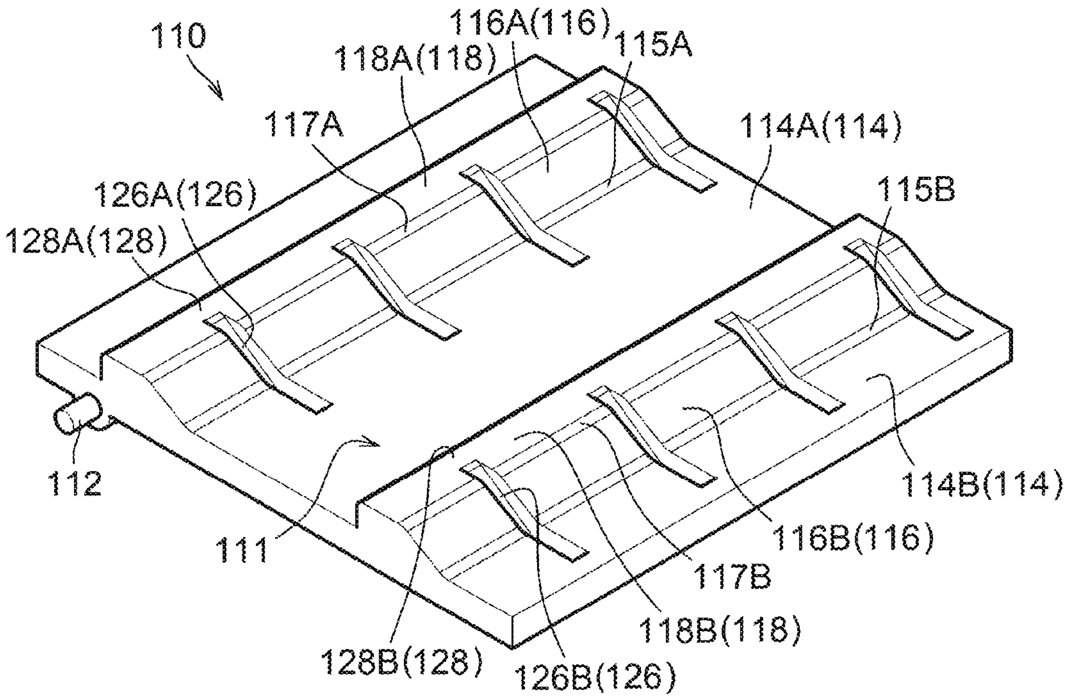
FIG. 3A is a perspective view of the movable cam.

As illustrated in FIG. 3A, the movable cam 110 includes an upper surface 111 and a cylindrical protrusion 112. The cylindrical protrusion 112 is positioned at one of side faces of the movable cam 110 in the second direction. The movable cam 110 is slidable over an upper surface of a guide portion 22B (refer to FIGS. 5A and 5B) of the main body casing 2.

As illustrated in FIG. 2, the arm 152 has one end portion 152A and the other end portion 152B.

The arm 152 has a through hole 154 at the one end portion 152A. The through hole 154 supports the cylindrical protrusion 112 of the movable cam 110 so as to allow the cylindrical protrusion 112 to rotate therein. The arm 152 includes the cylindrical protrusion 156 at the other end portion 152B. The cylindrical protrusion 156 is engaged with the elongated hole C3 of the arm retaining portion C2.

Figure 3B:
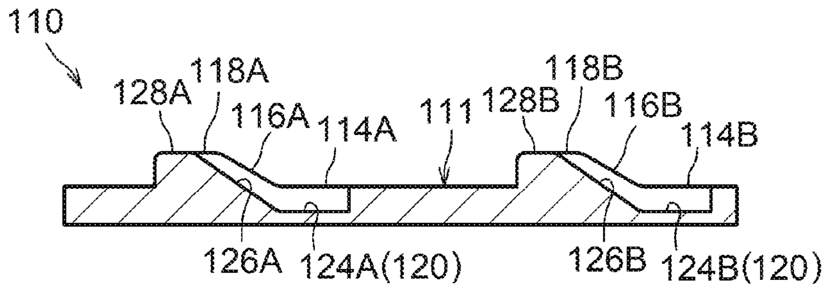
FIG. 3B is a sectional view of the movable cam.

As illustrated in FIGS. 3A and 3B, the movable cam 110 has a pair of drum separation surfaces 114, a pair of drum inclined surfaces 116, and a pair of drum contact surfaces 118. More specifically, for example, the upper surface 111 of the movable cam 110 includes the pair of drum separation surfaces 114, the pair of drum inclined surfaces 116, and the pair of drum contact surfaces 118.

The pair of drum separation surfaces 114 includes a first drum separation surface 114A and a second drum separation surface 114B. The first drum separation surface 114A is closer to the opening 22A than the second drum separation surface 114B is to the opening 22A. The first drum separation surface 114A and the second drum separation surface 114B each extend in the first direction. The second drum separation surface 114B is spaced from the first drum separation surface 114A in the first direction.

The pair of drum inclined surfaces 116 includes a first drum inclined surface 116A and a second drum inclined surface 116B. The first drum inclined surface 116A is closer to the opening 22A than the second drum inclined surface 116B is to the opening 22A. The first drum inclined surface 116A extends toward the intermediate transfer belt 63 from the first drum separation surface 114A. The first drum inclined surface 116A is inclined relative to the first direction. The second drum inclined surface 116B is spaced from the first drum inclined surface 116A in the first direction. The second drum inclined surface 116B extends toward the intermediate transfer belt 63 from the second drum separation surface 114B. The second drum inclined surface 116B is inclined relative to the first direction.

The first drum inclined surface 116A is positioned between the first drum separation surface 114A and a first drum contact surface 118A in the first direction. Likewise, the second drum inclined surface 116B is positioned between the second drum separation surface 114B and a second drum contact surface 118B in the first direction.

The first drum separation surface 114A and the first drum inclined surface 116A are connected by a connecting portion 115A having a curved surface. The connecting portion 115A may enable a first drum contact portion 135A to move smoothly between the first drum separation surface 114A and the first drum inclined surface 116A. Likewise, the second drum separation surface 114B and the second drum inclined surface 116B are connected by a connecting portion 115B having a curved surface. The connecting portion 115B may enable a second drum contact portion 135B to move smoothly between the second drum separation surface 114B and the second drum inclined surface 116B.

The pair of drum contact surfaces 118 includes a first drum contact surface 118A and a second drum contact surface 118B. The first drum contact surface 118A is closer to the opening 22A than the second drum contact surface 118B is to the opening 22A. The first drum contact surface 118A extends from the first drum inclined surface 116A in the first direction. The first drum contact surface 118A is closer to the intermediate transfer belt 63 than the first drum separation surface 114A is to the intermediate transfer belt 63 in the up-down direction. The second drum contact surface 118B is spaced from the first drum contact surface 118A in the first direction. The second drum contact surface 118B extends from the second drum inclined surface 116B in the first direction. The second drum contact surface 118B is closer to the intermediate transfer belt 63 than the second drum separation surface 114B is to the intermediate transfer belt 63 in the up-down direction.

The first drum inclined surface 116A and the first drum contact surface 118A are connected by a connecting portion 117A having a curved surface. The connecting portion 117A may enable the first drum contact portion 135A to move smoothly between the first drum separation surface 116A and the first drum inclined surface 118A. Likewise, the second drum inclined surface 116B and the second drum contact surface 118B are connected by a connecting portion 117B having a curved surface. The connecting portion 117B may enable the second drum contact portion 135B to move smoothly between the second drum inclined surface 116B and the second drum contact surface 118B.

The movable cam 110 further has a pair of developing separation surfaces 124, a pair of developing inclined surfaces 126, and a pair of developing contact surfaces 128. More specifically, for example, the upper surface 111 of the movable cam 110 further includes the pair of developing separation surfaces 124, the pair of developing inclined surfaces 126, and the pair of developing contact surfaces 128.

The pair of developing separation surfaces 124 corresponds to the pair of drum separation surfaces 114. The pair of developing separation surfaces 124 is positioned lower than the pair of drum separation surfaces 114.

The pair of developing inclined surfaces 126 corresponds to the pair of drum inclined surfaces 116. The pair of developing inclined surfaces 126 is positioned lower than the pair of drum inclined surfaces 116.

The pair of developing contact surfaces 128 corresponds to the pair of drum contact surfaces 118.

Each of the pair of developing separation surfaces 124, the pair of developing inclined surfaces 126, the pair of developing contact surfaces 128 is provided at four respective positions in the second direction.

The pair of developing separation surfaces 124 includes a first developing separation surface 124A and a second developing separation surface 124B. The first developing separation surface 124A is closer to the opening 22A than the second developing separation surface 114B is to the opening 22A. The first developing separation surface 124A and the second developing separation surface 124B each extend in the first direction. The second developing separation surface 124B is spaced from the first developing separation surface 124A in the first direction.

The pair of developing inclined surfaces 126 includes a first developing inclined surface 126A and a second developing inclined surface 126B. The first developing inclined surface 126A is closer to the opening 22A than the second developing inclined surface 126B is to the opening 22A. The first developing inclined surface 126A extends toward the intermediate transfer belt 63 from the first developing separation surface 124A. The first developing inclined surface 126A is inclined relative to the first direction. The second developing inclined surface 126B is spaced from the first developing inclined surface 126A in the first direction. The second developing inclined surface 126B extends toward the intermediate transfer belt 63 from the second developing separation surface 124B. The second developing inclined surface 126B is inclined relative to the first direction.

The first developing inclined surface 126A is positioned between the first developing separation surface 124A and a first developing contact surface 128A in the first direction. Likewise, the second developing inclined surface 126B is positioned between the second developing separation surface 124B and a second developing contact surface 128B in the first direction.

The pair of developing contact surfaces 128 includes a first developing contact surface 128A and a second developing contact surface 128B. The first developing contact surface 128A is closer to the opening 22A than the second developing contact surface 128B is to the opening 22A. The first developing contact surface 128A extends from the first developing inclined surface 126A in the first direction. The first developing contact surface 128A is closer to the intermediate transfer belt 63 than the first developing separation surface 124A is to the intermediate transfer belt 63 in the up-down direction. The second developing contact surface 128B is spaced from the first developing contact surface 128A in the first direction. The second developing contact surface 128B extends from the second developing inclined surface 126B in the first direction. The second developing contact surface 128B is closer to the intermediate transfer belt 63 than the second developing separation surface 124B is to the intermediate transfer belt 63 in the up-down direction.

The first developing contact surface 128A is flush with the first drum contact surface 118A. The second developing contact surface 128B is flush with the second drum contact surface 118B.

The developing separation surface 124 and the developing inclined surface 126 are connected by a connecting portion. The developing inclined surface 126 and the developing contact surface 128 are connected by a connection portion. Those connecting portions may each have a curved surface.

Figure 4B:
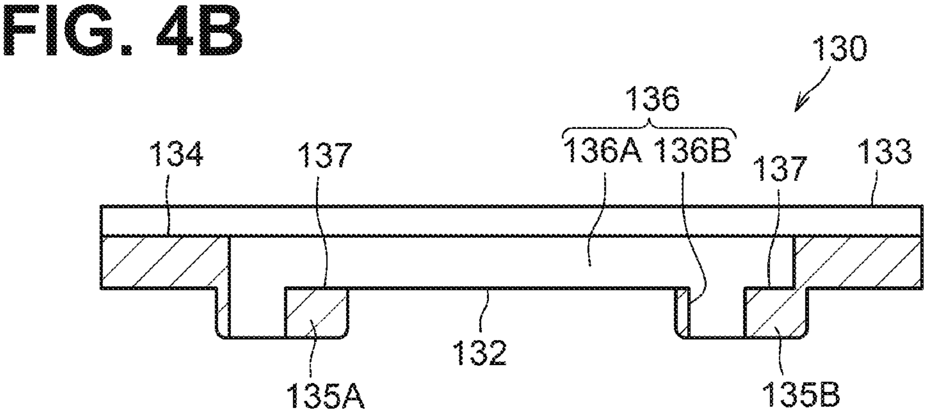
FIG. 4B is a sectional view of the first lifter.

The first lifter 130 is engaged with the movable cam 110. The first lifter 130 is configured to displace the drum cartridges 40 upward. As illustrated in FIGS. 4A and 4B, the first lifter 130 has an upper surface 131 and a lower surface 132. The four drum guide protrusions 133 and the four developing guide protrusions 134 are positioned at the upper surface 131 of the first lifter 130. All of the drum guide protrusions 133 may have the same configuration. All of the developing guide protrusions 134 may have the same configuration. Therefore, one of the drum guide protrusions 133 and one of the developing guide protrusions 134 will be described in detail, and a description for the others will be omitted. The first lifter 130 further includes the first drum contact portion 135A and the second drum contact portion 135B each contactable to the upper surface 111 of the movable cam 110. The second drum contact portion 135B is spaced from the first drum contact portion 135A in the first direction. More specifically, for example, an interval between the first drum contact portion 135A and the second drum contact portion 135B in the first direction may be equal to an interval between the first drum inclined surface 116A and the second drum inclined surface 116B in the first direction.

The drum guide protrusion 133 extends in the first direction. The drum guide protrusion 133 is configured to guide movement of a corresponding drum cartridge 40.

The developing guide protrusion 134 extends in the first direction. The developing guide protrusion 134 is configured to guide movement of a corresponding developing cartridge 50. The developing guide protrusion 134 has a dimension greater than a dimension of the drum guide protrusion 133 in the up-down direction.

The developing guide protrusion 134 has a guide cavity 136. The guide cavity 136 may be a through hole. The guide cavity 136 extends in the first direction and is configured to receive a corresponding second lifter 140 therein. As illustrated in FIG. 4B, the guide cavity 136 has a first portion 136A and second portions 136B. The first portion 136A may a hollow space and penetrate the developing guide protrusion 134 in the up-down direction. The second portions 136B may be hollow spaces. The second portions 136B are in communication with the first portion 136A and penetrate the first drum contact portion 135A and the second drum contact portion 135B, respectively. The first lifter 130 further has a support surface 137 in each guide cavity 136. The support surface 137 functions as a stopper for a second lifter 140 placed in the guide cavity 136.

Figures 5A, 5B:
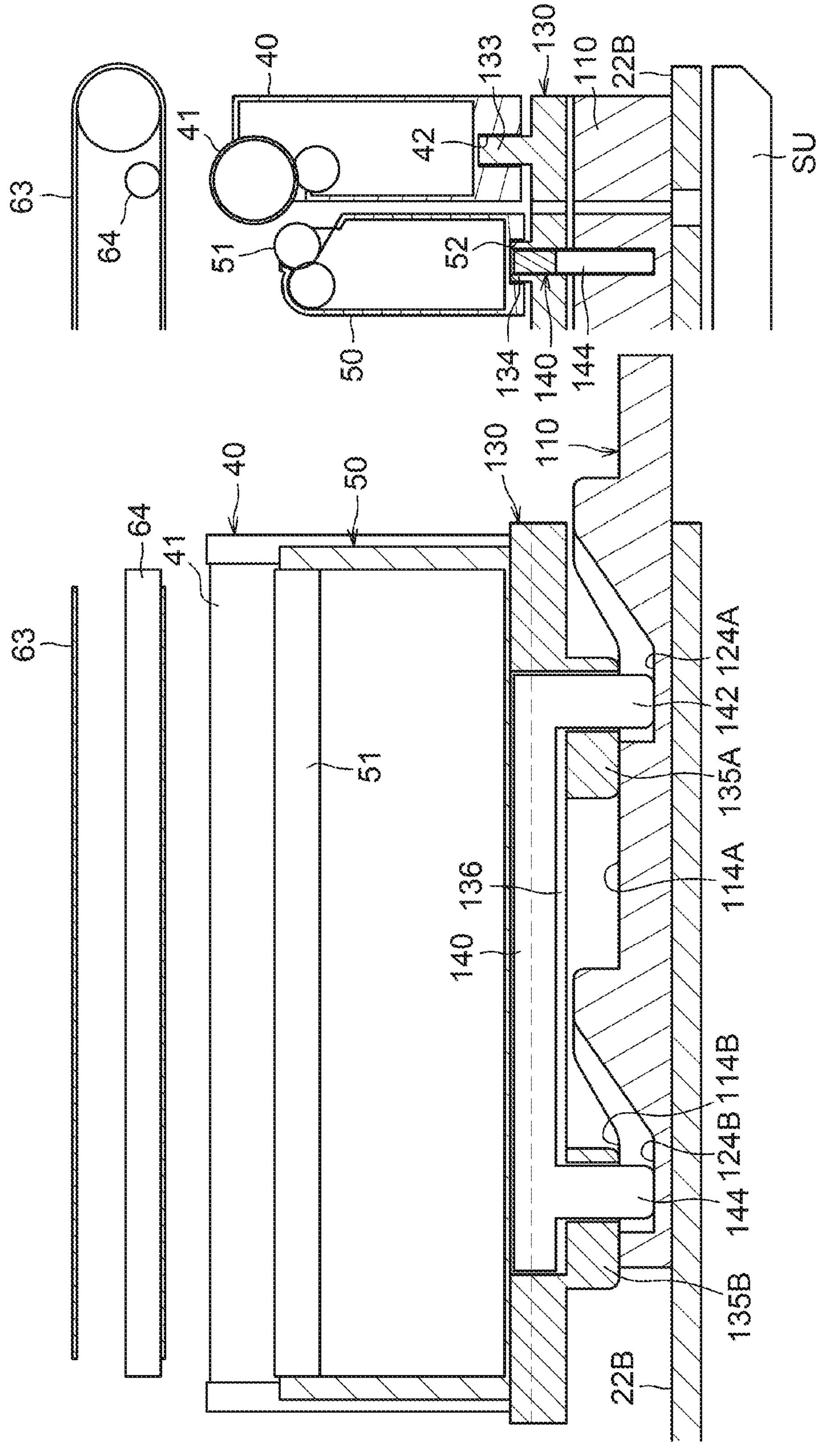
FIG. 5A is a partial sectional view of the color printer cut in a plane perpendicular to a second direction when the movable cam is located in a first position.
FIG. 5B is a partial sectional view of the color printer cut in the plane perpendicular to a first direction when the movable cam is located in the first position.

As illustrated in FIG. 5B, the first lifter 130, the movable cam 110, and the guide portion 22B each have a through hole for allowing a laser beam emitted by the exposure device SU to path therethrough.

All of the second lifters 140 may have the same configuration. Therefore, one of the second lifters 140 will be described in detail, and a description for the others will be omitted. The second lifter 140 is configured to engage the movable cam 110 to displace a corresponding developing cartridge 50 upward. The second lifter 140 may be placed in a corresponding guide cavity 136. The second lifter 140 includes a body portion 141, a first developing contact portion 142, and a second developing contact portion 144. The body portion 141 extends in the first direction. The first developing contact portion 142 and the second developing contact portion 144 each extend downward from the body portion 141. The body portion 141 is supported by the support surface 137 when the second lifter 140 is assembled to the corresponding guide cavity 136. The first developing contact portion 142 and the second developing contact portion 144 each contact the upper surface 111 of the movable cam 110 through the second portions 136B of the guide cavity 136. The second developing contact portion 144 is spaced from the first developing contact portion 142 in the first direction. The second lifter 140 is movable up and down in the guide cavity 136.

In a state where the second lifter 140 is placed in the guide cavity 136, a lower end portion of the first developing contact portion 142 and a lower end portion of the second developing contact portion 144 protrude downward relative to a lower end of the first drum contact portion 135A and a lower end of the second drum contact portion 135B, respectively.

Although, referring to FIGS. 2, and 5A to 7B, a description will be provided on insertion of one of the drum cartridges 40 and one of the developing cartridges 50 and positioning of a developing roller 51 of the drum cartridge 40 and a photosensitive drum 41 of the developing cartridge 50, the description may apply to the others.

As illustrated in FIG. 2, when the cover C is located at the open position to uncover the opening 22A, a drum cartridge 40 and a developing cartridge 50 are inserted into the main body casing 2. More specifically, for example, the drum cartridge 40 is inserted into the main body casing 2 in the first direction along the upper surface 131 of the first lifter 130 with the drum groove 42 being engaged with the drum guide protrusion 133. Likewise, the developing cartridge 50 is inserted into the main body casing 2 in the first direction along the upper surface 131 of the first lifter 130 with the developing groove 52 being engaged with the developing guide protrusion 134.

As illustrated in FIGS. 5A and 5B, when the cover C is located at the open position, the movable cam 110 is located in a first position.

More specifically, for example, when the movable cam 110 is located in the first position, the first drum contact portion 135A is in contact with the first drum separation surface 114A and the second drum contact portion 135B is in contact with the second drum separation surface 114B. In such a state, the first lifter 130 is located at a lower position. The photosensitive drum 41 of the drum cartridge 40 is thus spaced from the intermediate transfer belt 63. When the movable cam 110 is located in the first position, the first developing contact portion 142 is in contact with the first developing separation surface 124A and the second developing contact portion 144 is in contact with the second developing separation surface 124B. In such a state, the second lifter 140 might not protrude relative to the upper surface 133 of the first lifter 130. The developing roller 51 of the developing cartridge 50 is thus spaced from the photosensitive drum 41.

That is, when the cover C is located at the open position, the movable cam 110 is located in the first position, the photosensitive drum 41 is spaced from the intermediate transfer belt 63, and the developing roller 51 is spaced from the photosensitive drum 41.

Figure 6B:
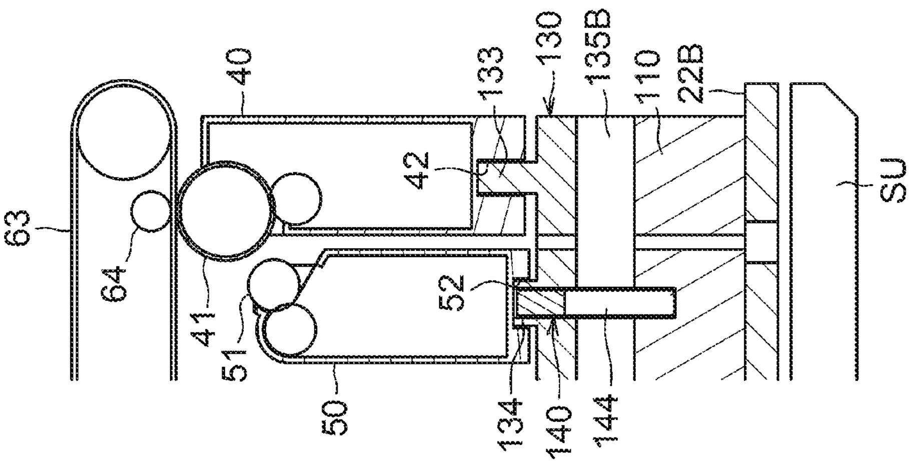
FIG. 6B is a partial sectional view of the color printer cut in a plane perpendicular to the first direction when the movable cam is located in the second position.
Figure 6A:
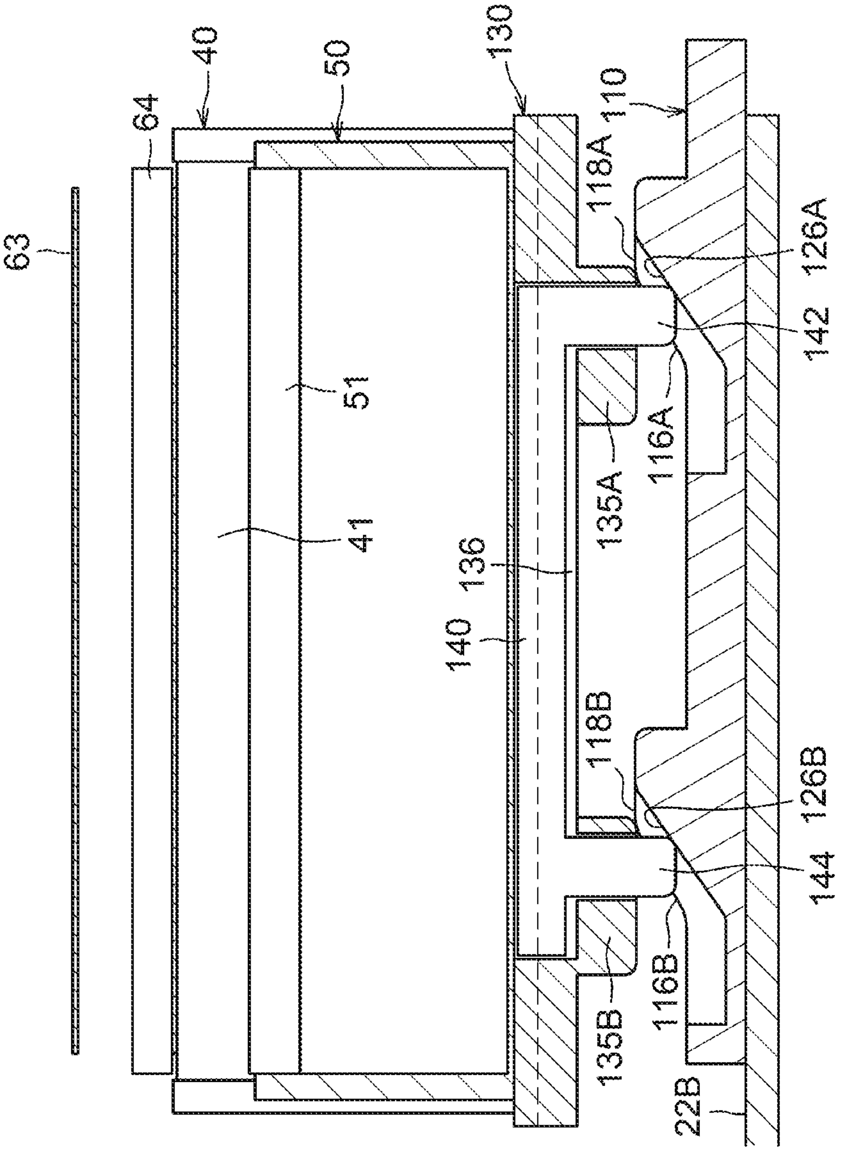
FIG. 6A is a partial sectional view of the color printer cut in a plane perpendicular to the second direction when the movable cam is located in a second position.

As illustrated in FIGS. 6A and 6B, while the cover C moves from the open position to the closed position, the movable cam 110 moves to and stays in a second position.

More specifically, for example, as the cover C moves from the open position toward the closed position, the arm 152 causes the movable cam 110 to move away from the opening 22A along the first direction. While the movable cam 110 moves from the first position to the second position, the first drum contact portion 135A comes into contact with the first drum inclined surface 116A and the second drum contact portion 135B comes into contact with the second drum inclined surface 116B. Thus, the first lifter 130 moves upward toward the intermediate transfer belt 63. While the movable cam 110 moves from the first position to the second position, the first developing contact portion 142 comes into contact with the first developing inclined surface 126A and the second developing contact portion 144 comes into contact with the second developing inclined surface 126B. Thus, the second lifter 140 moves upward toward the intermediate transfer belt 63.

As the cover C further moves toward the closed position, the movable cam 110 further moves along the first direction while staying in the second position.

When the movable cam 110 is located in the second position in such a state, the first drum contact portion 135A is in contact with the first drum contact surface 118A and the second drum contact portion 135B is in contact with the second drum contact surface 118B. At that time, the first lifter 130 is located at an upper position and the photosensitive drum 41 of the drum cartridge 40 supported by the first lifter 130 is in contact with the intermediate transfer belt 63.

When the movable cam 110 is located in the second position in such a state, the first developing contact portion 142 remains contact the first developing inclined surface 126A and the second developing contact portion 144 remains contact the second developing inclined surface 126B. In other words, while the movable cam 110 moves from the first position to the second position, the first developing contact portion 142 comes into contact with the first developing inclined surface 126A and the second developing contact portion 144 comes into contact with the second developing inclined surface 126B. In such a state, the second lifter 140 might not protrude relative to the upper surface 133 of the first lifter 130. The developing roller 51 of the developing cartridge 50 thus remains spaced from the photosensitive drum 41.

That is, when the movable cam 110 is located in the second position, the photosensitive drum 41 is in contact with the intermediate transfer belt 63 and the developing roller 51 is spaced from the photosensitive drum 41.

Figure 7A:
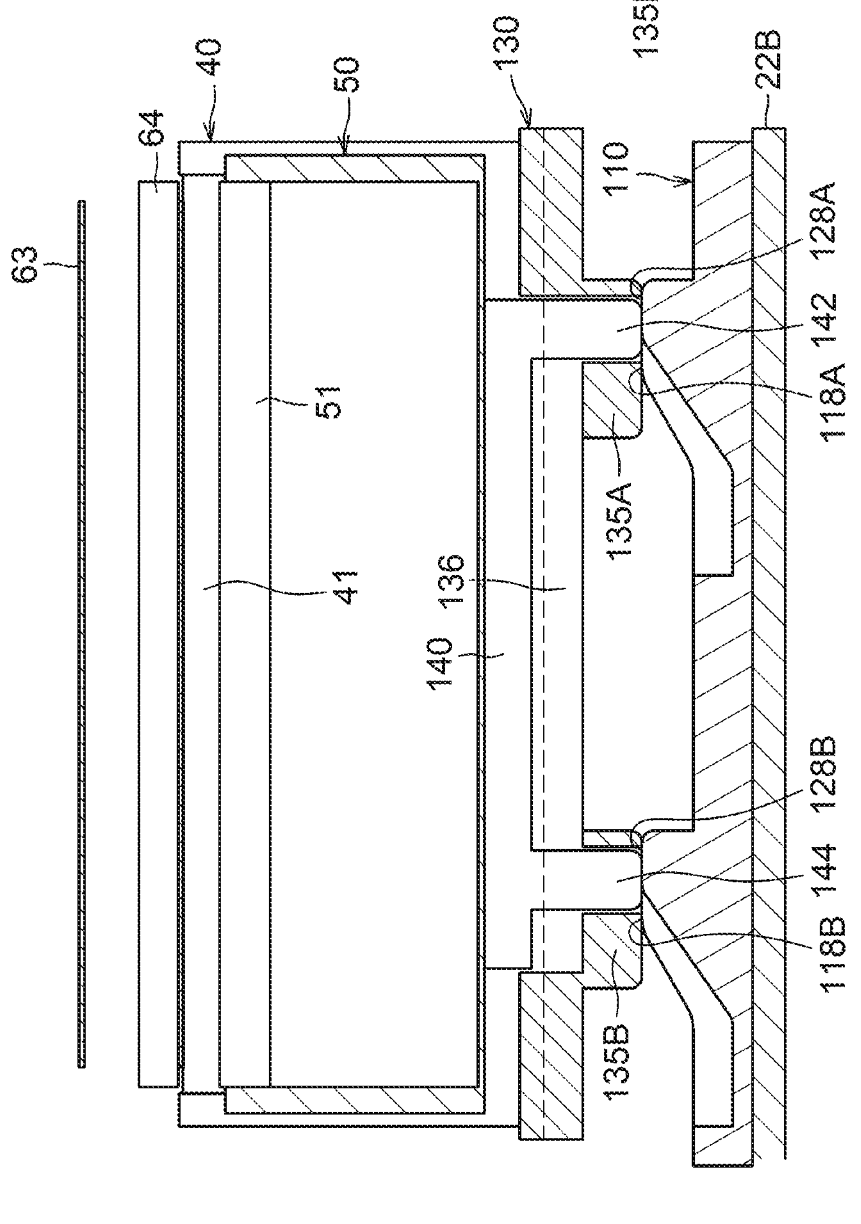
FIG. 7A is a partial sectional view of the color printer cut in a plane perpendicular to the second direction when the movable cam is located in a third position.
Figure 7B:
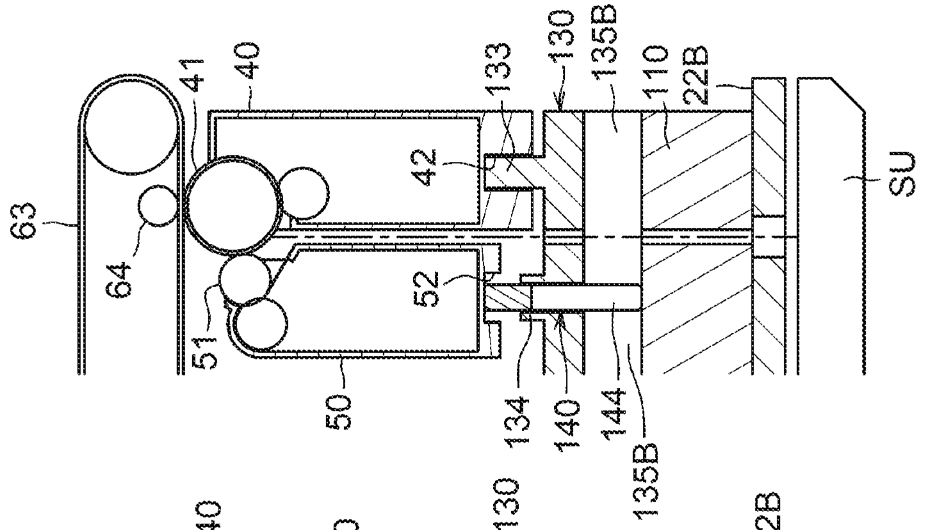
FIG. 7B is a partial sectional view of the color printer cut in a plane perpendicular to the first direction when the movable cam is located in the third position.

As illustrated in FIGS. 7A and 7B, when the cover C is located at the closed position, the movable cam 110 is located in a third position.

More specifically, for example, when the movable cam 110 is located in the third position, the first drum contact portion 135A is in contact with the first drum contact surface 118A and the second drum contact portion 135B is in contact with the second drum contact surface 118B. At that time, the first lifter 130 is located at the upper position and the photosensitive drum 41 of the drum cartridge 40 supported by the first lifter 130 remains contact with the intermediate transfer belt 63. When the movable cam 110 is located in the third position, the first developing contact portion 142 is in contact with the first developing contact surface 128A and the second developing contact portion 144 is in contact with the second developing contact separation surface 128B. In response to the first developing contact portion 142 contacting the first developing contact surface 128A and the second developing contact portion 144 contacting the second developing contact separation surface 128B, the second lifter 140 protrudes upward relative to the guide cavity 136. The developing cartridge 50 is thus pressed by the second lifter 140 to move upward toward the drum cartridge 40. Consequently, the developing roller 51 comes into contact with the photosensitive drum 41.

That is, when the movable cam 110 is located in the third position, the photosensitive drum 41 is in contact with the intermediate transfer belt 63 and the developing roller 51 is in contact with the photosensitive drum 41.

As illustrated in FIG. 3B, a downstream end of the first drum contact surface 118A is located further downstream than a downstream end of the first developing contact surface 128A in a direction in which the movable cam 110 moves toward the third position from the first position. Likewise, a downstream end of the second drum contact surface 118B is located further downstream than a downstream end of the second developing contact surface 128B in the direction in which the movable cam 110 moves toward the third position from the first position.

With such a configuration, the first drum contact portion 135A and the second drum contact portion 135B move onto the first drum contact surface 118A and the second drum contact surface 118B, respectively, and then the first developing contact portion 142 and the second developing contact portion 144 move onto the first developing contact surface 128A and the second developing contact surface 128B, respectively. Consequently, after the photosensitive drum 41 contacts the intermediate transfer belt 63, the developing roller 51 contacts the photosensitive drum 41.

In another example, the timing at which the developing roller 51 contacts the photosensitive drum 41 after the photosensitive drum 41 contacts the intermediate transfer belt 63 may be changed. To implement such a timing change, the distance between the downstream end of the first drum contact surface 118A and the downstream end of the first developing contact surface 128A and the distance between the downstream end of the second drum contact surface 118B and the downstream end of the second developing contact surface 128B may be changed.

According to the illustrative embodiment, the following effects may be achieved.

A single action in which a user moves the cover C from the open position to the closed position may enable the contact of the intermediate transfer belt 63 and the photosensitive drum 41 achieved by displacement of the drum cartridge 40 toward the intermediate transfer belt 63 and the contact of the photosensitive drum 41 and the developing roller 51 achieved by displacement of the developing cartridge 50 toward the drum cartridge 40 without using a motor.

While the movable cam 110 moves in conjunction with opening or closing of the cover C, the first drum contact portion 135A of the first lifter 130 contacts one of the first drum separation surface 114A, the first drum inclined surface 116A, and the first drum contact surface 118A to change the position of the first lifter 130 in the up-down direction, thereby enabling the drum cartridge 40 to be positioned at respective specified positions.

While the movable cam 110 moves in conjunction with opening or closing of the cover C, the first developing contact portion 142 of the second lifter 140 contacts one of the first developing separation surface 124A, the first developing inclined surface 126A, and the first developing contact surface 128A to change the position of the second lifter 140 in the up-down direction, thereby enabling the developing cartridge 50 to be positioned at respective specified positions.

The first lifter 130 includes two drum contact portions 135A and 135B and the second lifter 140 includes two developing contact portions 142 and 144. That is, the movable cam 110 presses the drum contact portions 135A and 135B and the developing contact portions 142 and 144. Such a configuration may thus enable the drum cartridge 40 and the developing cartridge 50 to be positioned stably at their respective specified positions.

The developing guide protrusion 134 has the guide cavity 136 and the second lifter 140 placed in the guide cavity 136 is movable therein. Such a configuration may thus enable positioning of the developing roller 51 relative to the photosensitive drum 41 by displacement of the developing cartridge 50 toward the drum cartridge 40 by the second lifer 140 after positioning the photosensitive drum 41 relative to the intermediate transfer belt 63 by displacement of the drum cartridge 40 and the developing cartridge 50 toward the intermediate transfer belt 53 by the first lifter 130.

While the disclosure has been described in detail with reference to the specific embodiment thereof, this is merely an example, and various changes, arrangements and modifications may be applied therein without departing from the spirit and scope of the disclosure.

In the illustrative embodiment, the first lifter 130 is configured to displace the drum cartridge 40 and the developing cartridge 50 toward the intermediate transfer belt 63 in conjunction with closing of the cover C, and the second lifter 140 is configured to further displace the developing cartridge 50 toward the intermediate transfer belt 63.

Nevertheless, in other embodiments, for example, a drum lifter may be configured to engage the upper surface 111 of the movable cam 110 to move the drum cartridge 40 upward. A developing lifter may be configured to engage the upper surface 111 of the movable cam 110 to move the developing cartridge 50 upward. The drum lifer and the developing lifter may be movable independent of each other.

In such a configuration, the drum lifter may include drum guide protrusions at its upper surface and the developing lifter may include developing guide protrusions at its upper surface.

In the illustrative embodiment, the first lifter 130 includes the drum guide protrusions 133 and the developing guide protrusions 134, each drum cartridge 40 has the drum groove 42, and each developing cartridge 50 has the developing groove 52. Nevertheless, in other embodiments, for example, the first lifter 130 may have drum guide grooves instead of the drum guide protrusions 133 and each drum cartridge 40 may include a drum protrusion instead of the drum groove 42. The first lifter 130 may have developing guide grooves instead of the developing guide protrusions 134 and each developing cartridge 50 may include a developing protrusion instead of the developing groove 52. In still other embodiments, such alternative examples may be combined.

In the illustrative embodiment, the movable cam 110 includes one pair (two) each of the drum separation surface 114, the drum inclined surface 116, the drum contact surface 118, the developing separation surface 124, the developing inclined surface 126, and the developing contact surface 128. The first lifter 130 includes the first drum contact portion 135A and the second drum contact portion 135B, and the second lifter 140 includes the first developing contact portion 142 and the second developing contact portion 144. Nevertheless, the number of each surface of the movable cam 110, the number of contact portions of the first lifter 130, and the number of contact portions of the second lifter 140 are not limited to the specific example.

In other embodiments, for example, the movable cam 110 may include one each of the drum separation surface 114, the drum inclined surface 116, the drum contact surface 118, the developing separation surface 124, the developing inclined surface 126, and the developing contact surface 128. The first lifter 130 may include a single drum contact portion and the second lifter 140 may include a single developing contact portion.

In still other embodiments, for example, the movable cam 110 may include no developing separation surface.

In the above-described illustrative embodiment and modifications, the disclosure has been applied to the color printer 1. Nevertheless, the disclosure is not limited to the color printer 1. In other embodiments, for example, the disclosure may be applied to other image forming apparatuses such as monochrome printers, copying machines, and multifunction devices.

The elements described in the respective illustrative embodiments or modifications may be combined to implement the disclosure.

What is claimed is:

1. An image forming apparatus comprising:
a main body casing having an opening;
a cover movable between an open position in which the cover opens the opening and a closed position in which the cover closes the opening;
a drum unit including a photosensitive drum rotatable about a first axis extending in a first direction;
a developing unit including a developing roller rotatable about a second axis extending in the first direction;
an intermediate transfer belt positioned above the drum unit and the developing unit; and
a movable member configured to move as the cover moves from the open position to the closed position,
wherein, the movable member is configured to move the drum unit independently and separately from the developing unit, and the movable member is configured to move the developing unit independently and separately from the drum unit.

2. The image forming apparatus according to claim 1, wherein the movable member includes:
a first lifter configured to displace the drum unit; and
at least one second lifter configured to displace the developing unit.

3. The image forming apparatus, according to claim 1, wherein the drum unit is insertable into and removable from the main body casing in the first direction through the opening.

4. The image forming apparatus, according to claim 1, further comprising:
a discharge unit configured to discharge a sheet, the discharge unit positioned above the intermediate transfer belt.

5. The image forming apparatus, according to claim 1, further comprising:
a feed unit configured to feed a sheet, the feed unit positioned below the movable member.

6. The image forming apparatus, according to claim 1, wherein the drum unit and the developing unit are arranged in a second direction intersecting the first direction in a state where the drum unit and the developing unit are attached to the main body casing.

7. The image forming apparatus, according to claim 1, wherein the developing unit is insertable into and removable from the main body casing in the first direction through the opening.

8. The image forming apparatus, according to claim 1, wherein in a case where the cover is at the open position, the movable member is at a first position,
wherein while the cover moves from the open position to the closed position, the movable member is at a second position, and
wherein in a case where the cover is at the closed position, the movable member is at a third position.

* * * * *